United States Patent
Bowman et al.

(10) Patent No.: US 9,366,379 B2
(45) Date of Patent: Jun. 14, 2016

(54) SIT-STAND WORKSTATION WITH DISPLAY SUPPORT APPARATUS

(71) Applicant: Innovative Office Products, LLC, Easton, PA (US)

(72) Inventors: Stephen J. Bowman, Allentown, PA (US); Peter J. Carrasquillo, Easton, PA (US); Michael P. Smith, Allentown, PA (US); Carl J. Hochberg, Lehighton, PA (US); Matthew A Sommerfield, Allentown, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

(21) Appl. No.: 14/561,910

(22) Filed: Dec. 5, 2014

(65) Prior Publication Data
US 2015/0159804 A1    Jun. 11, 2015

Related U.S. Application Data

(60) Provisional application No. 61/912,418, filed on Dec. 5, 2013, provisional application No. 62/009,325, filed on Jun. 8, 2014.

(51) Int. Cl.
| | | |
|---|---|---|
| F16M 13/00 | (2006.01) | |
| F16M 11/28 | (2006.01) | |
| F16M 11/04 | (2006.01) | |
| F16M 11/10 | (2006.01) | |
| F16M 11/20 | (2006.01) | |
| F16M 11/24 | (2006.01) | |
| A47B 97/00 | (2006.01) | |

(52) U.S. Cl.
CPC ............. *F16M 11/28* (2013.01); *F16M 11/045* (2013.01); *F16M 11/10* (2013.01); *F16M 11/2014* (2013.01); *F16M 11/2085* (2013.01); *F16M 11/24* (2013.01); *A47B 2097/005* (2013.01); *F16M 2200/048* (2013.01)

(58) Field of Classification Search
USPC ............ 248/157, 125.8, 161, 125.1, 917, 919
See application file for complete search history.

(56) References Cited

U.S. PATENT DOCUMENTS

| | | | | |
|---|---|---|---|---|
| 6,189,843 | B1 * | 2/2001 | Pfister | A47B 9/083 248/157 |
| 6,997,422 | B2 * | 2/2006 | Sweere | F16M 11/04 248/123.11 |
| 7,364,124 | B2 | 4/2008 | Yuasa et al. | |
| 7,752,932 | B2 | 7/2010 | Chen et al. | |
| 7,789,355 | B2 * | 9/2010 | Gan | F16M 11/04 248/157 |
| 8,333,159 | B2 | 12/2012 | Schroer et al. | |

(Continued)

OTHER PUBLICATIONS

Ergodesktop website, published at least as early as Jun. 30, 2013, retrieved from Internet Archive Wayback Machine, URL: http://web.archive.org/web/20130620103818/http://www.ergodesktop.com/products.

(Continued)

*Primary Examiner* — Steven Marsh
(74) *Attorney, Agent, or Firm* — Design IP

(57) ABSTRACT

In one respect, the invention of the present application is a sit-stand workstation comprising a worksurface and at least one support beam row adapted to support at least one electronic display therefrom, the worksurface and support beam row being clamped to an outer column that is axially aligned with and able to change height with respect to an inner column via an extension and retraction device that is attached between the inner and outer columns.

20 Claims, 9 Drawing Sheets

(56) References Cited

U.S. PATENT DOCUMENTS

| | | | |
|---|---|---|---|
| 8,342,465 B2 | 1/2013 | Koder | |
| 8,601,889 B2 * | 12/2013 | Lessing | F16H 25/20 74/89.34 |
| 2004/0118984 A1 * | 6/2004 | Kim | F16C 11/0619 248/149 |
| 2007/0138356 A1 * | 6/2007 | Johansson | F16M 11/20 248/125.1 |
| 2007/0205340 A1 | 9/2007 | Jung | |
| 2007/0252919 A1 | 11/2007 | McGreevy | |
| 2011/0278414 A1 | 11/2011 | Theis et al. | |
| 2013/0126682 A1 | 5/2013 | Tholkes et al. | |
| 2014/0332653 A1 | 11/2014 | Hazzard et al. | |

OTHER PUBLICATIONS

Ergotron website, published at least as early as Jul. 17, 2013, retrieved from Internet Archive Wayback Machine, URL: https://web.archive.org/web/20130717184943/http://www.ergotron.com/Portals/0/literature/productSheets/english/05-065.pdf.

Ergotron website, published at least as early as Mar. 9, 2013, retrieved from Internet Archive Wayback Machine, URL: https://web.archive.org/web/20130309061346/http://www.ergotron.com/Portals/0/literature/productSheets/english/05-118-EA.pdf.

Ergotron website, published at least as early as Feb. 1, 2013, retrieved from Internet Archive Wayback Machine, URL: https://web.archive.org/web/20130201215650/http://www.ergotron.com/Portals/0/tp/R1/WF/888-33-307-W.pdf.

* cited by examiner

SIT-STAND WORKSTATION WITH DISPLAY SUPPORT APPARATUS

FIELD OF THE INVENTION

The present invention relates to height-adjustable workstations, more particularly to a height-adjustable workstation capable of supporting one or more displays such that that height of the one or more displays can be adjusted for either seated or standing use.

BACKGROUND

The use of height-adjustable apparatuses that permit users to change the elevation of their one or more display devices are becoming increasingly popular. Many of these devices lack the ability to adjust the height of the entire workstation area along with the display(s), such that a user's keyboard and other peripherals are not useable when the display(s) are in a raised position. Further, many existing sit-stand devices allow only for adjustment of the entire desk surface, which is typically heavy and therefore requires more than one and/or very large lifting mechanism(s) to be provided. Many existing multi-display devices are not expandable or reconfigurable in order to support a different number of displays or to support the displays in an array of different configurations. Additionally, many existing devices are not height-adjustable such that the displays can be quickly and easily moved between heights in which the displays can be viewed.

There is a need for an improved sit-stand workstation that is versatile and configurable according to the wants and needs of individual users.

BRIEF DESCRIPTION OF THE DRAWINGS

The sit-stand workstation according to the present invention is further described with reference to the accompanying drawings, in which.

DETAILED DESCRIPTION OF THE PREFERRED EMBODIMENTS

Figure 1:
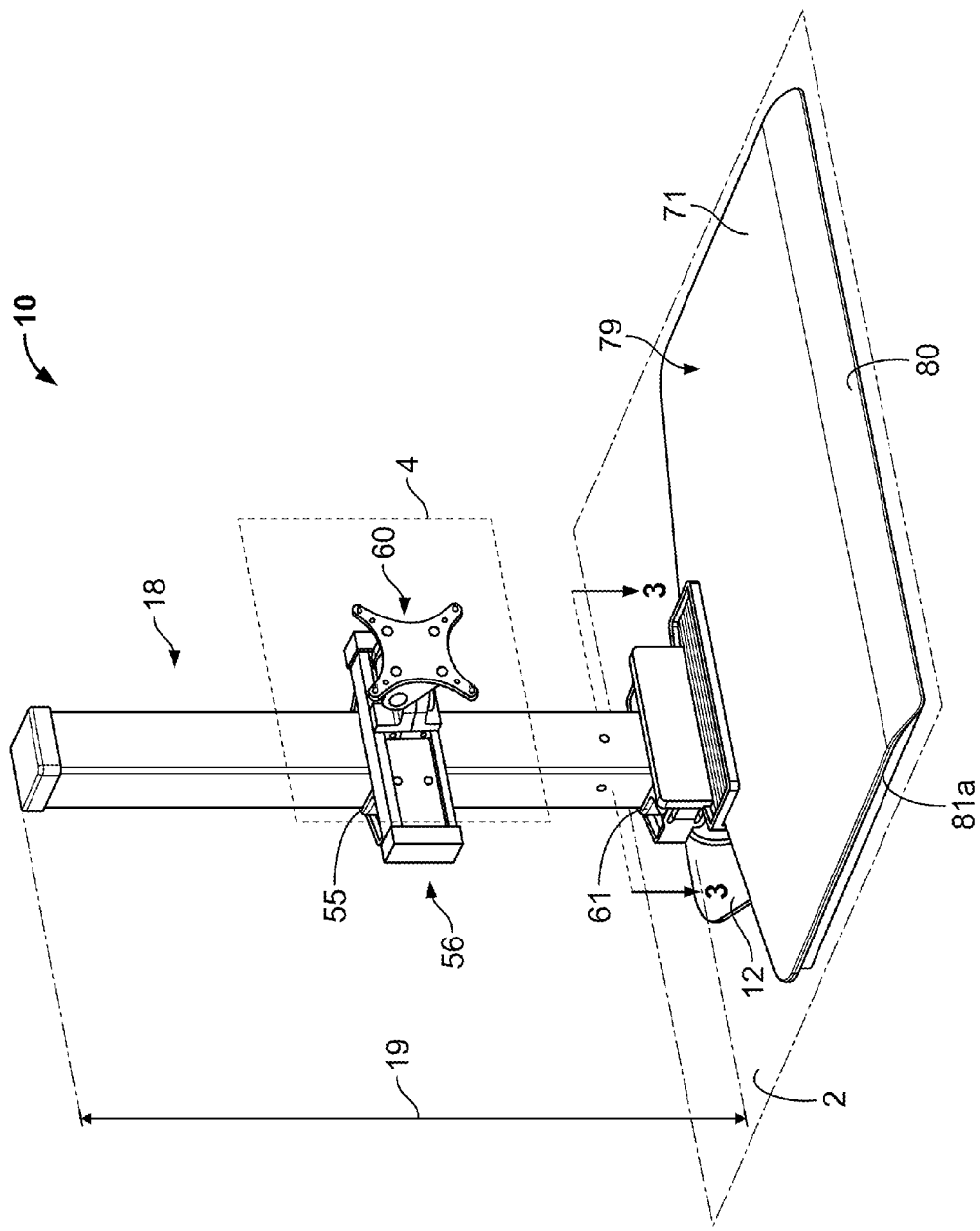
FIG. 1 is a perspective view of an embodiment of a sit-stand workstation according to the present invention, with a lift assembly thereof in a fully-lowered position.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It is understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

The present application incorporates by reference the entire contents of U.S. Provisional Application No. 61/912,418, filed Dec. 5, 2013 and U.S. Provisional Application No. 62/009,325, filed Jun. 8, 2014 as if the contents thereof were set forth herein in their entireties.

Sit-stand desks are increasingly common in the workplace to help users combat the recognized negative health effects of sitting all day. Many existing sit-stand devices allow only for adjustment of the entire desk surface, which is typically heavy and therefore requires more than one and/or heavy-duty lifting mechanism(s) to be provided. This drives up the costs of these devices and makes them slower and less energy-efficient to operate. Further, it is now common for computer users to simultaneously use multiple displays at their workstations. Because different users have different wants and needs with respect to their display configuration, it is desirable to have an expandable, modular sit-stand workstation that is highly configurable according to the specific needs and desires of a particular user.

Figure 9:
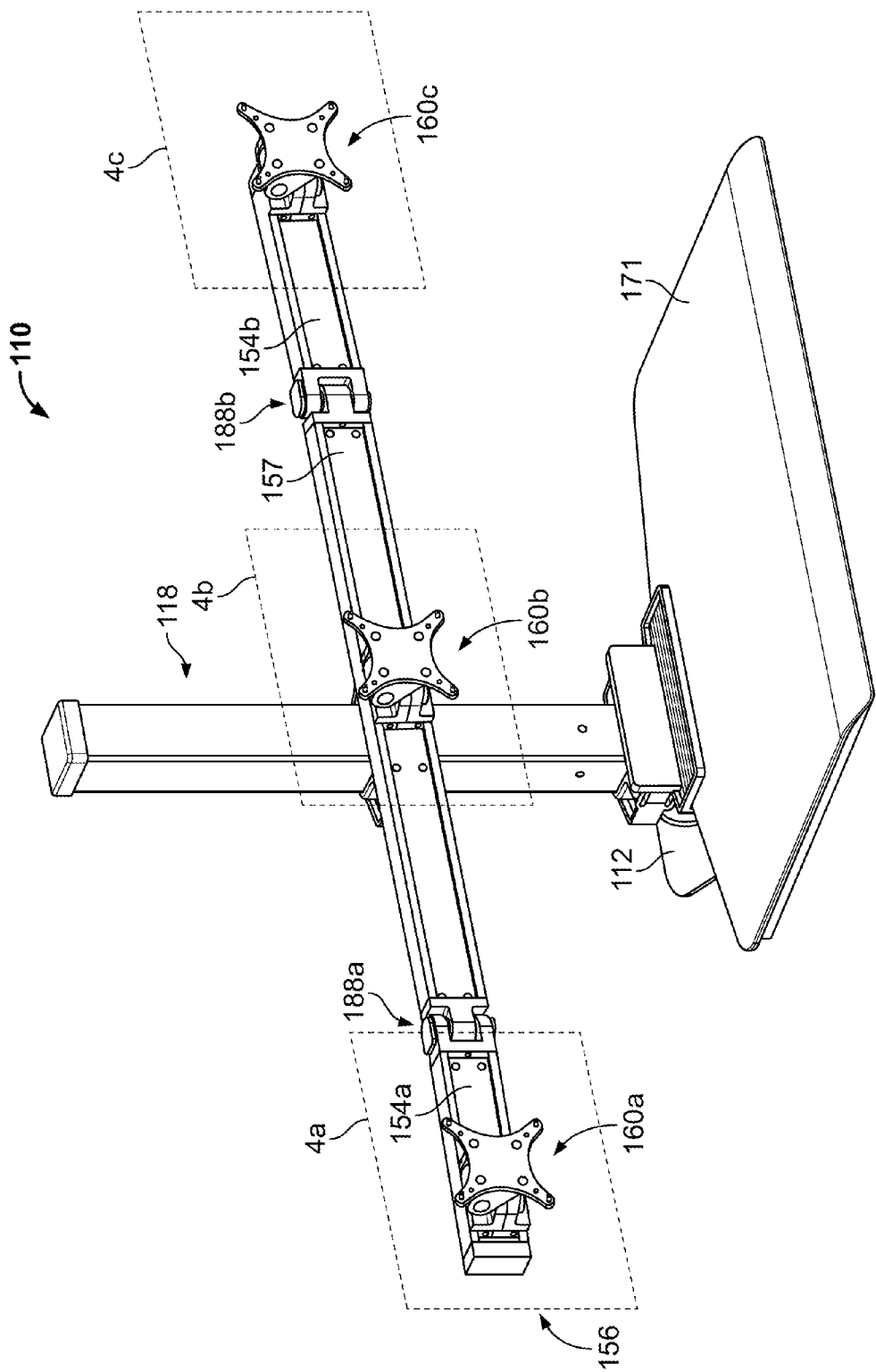
FIG. 9 is a perspective view of an alternate embodiment of a sit-stand workstation according to the present invention.

FIGS. 1-8 generally show a first embodiment of a sit-stand workstation 10 according to the present invention, and FIG. 9 shows a second embodiment of a sit-stand workstation 110. The workstation 10 of the first embodiment is configured to support a single display 4, and the workstation 110 of the second embodiment is configured to support three displays 4a-4c, as will be described in further detail below. It should be understood that any number of displays could be attached to the workstation in a multitude of various configurations, while remaining within the scope of the present invention. As would be appreciated by a person having ordinary skill in the relevant art, U.S. Provisional Application Nos. 61/912,418 and 62/009,325—which are incorporated herein by reference—teach expandable multi-display support apparatuses having many component parts that are interchangeable with the workstations 10,110 according to the present invention, and teach various display configurations that could be used with the workstations 10,110 taught herein.

Referring back to FIGS. 1-8, the workstation 10 comprises a base plate 12 for supporting the workstation 10 atop an existing support surface 2, which may be, for example, a desktop or tabletop surface. The support surface 2 (see FIG. 1) is assumed to be planar and lies in a plane "A." The base plate 12 has a planar bottom surface 13 that lies in a plane "B" and a top surface 15 that lies in a plane "C." In this embodiment, four pads 14a-14d are attached to the bottom surface 13, protect the support surface 2 from damage, and allow the user to quickly and easily slide the workstation 10 around on top of the support surface 2. While in this embodiment the base plate 12 permits the workstation 10 to be freestanding, the workstation 10 could alternatively be fixedly attached to the support surface 2 via a clamp mount or through mount.

Figure 2:
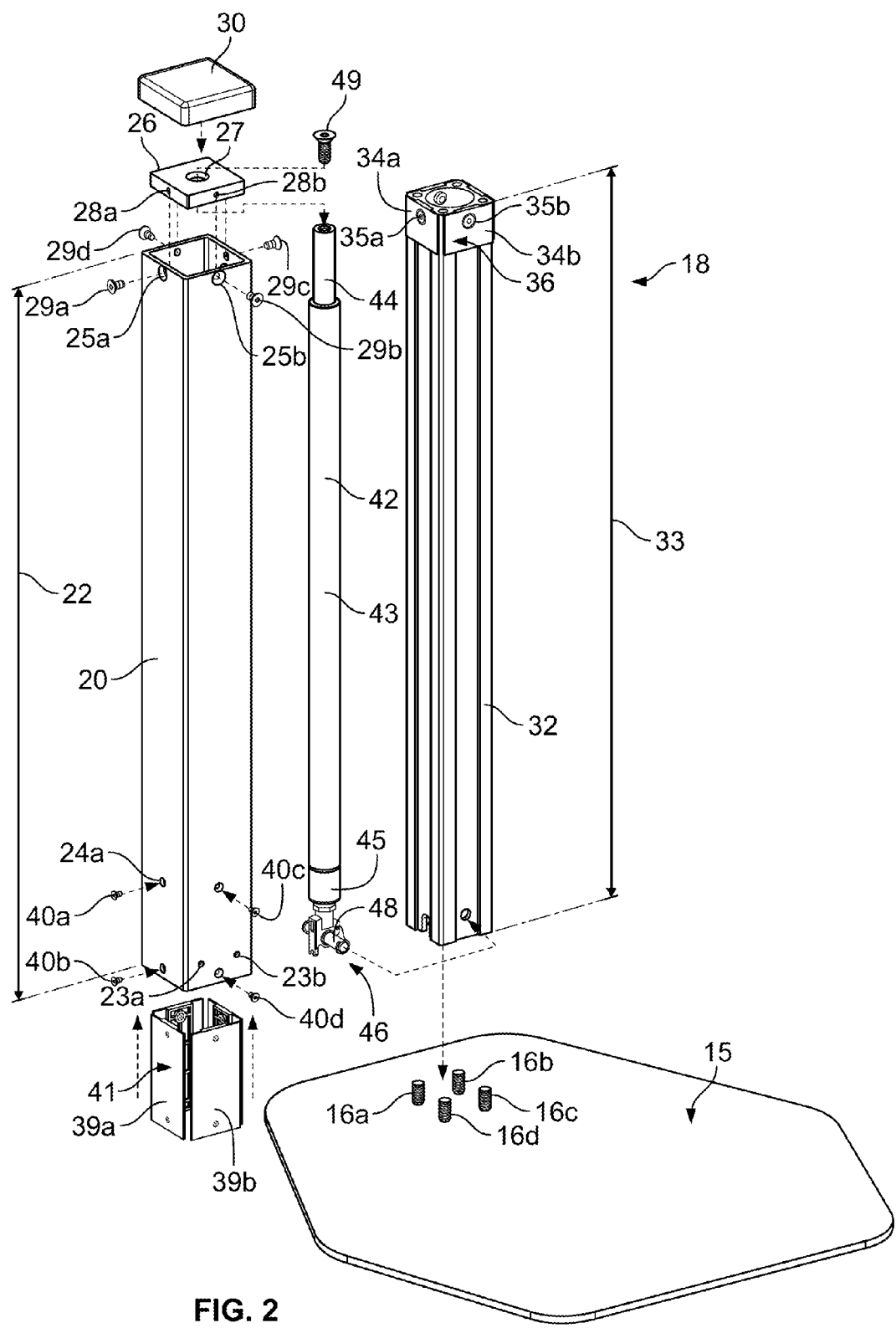
FIG. 2 is a partial exploded view of the lift assembly of the embodiment of FIG. 1.

As shown in FIG. 2, fasteners 16a-16d connect through the bottom surface 13 of the base plate 12 and are used to attach a lift assembly 18 to the base plate 12. The lift assembly 18 has a height 19 measured between the bottom end of the inner column 32 and the top end of the outer column 20. The lift assembly 18 comprises an inner column 32 that directly connects to the base plate 12 via the fasteners 16a-16d, an outer column 20, and an extension and retraction device 42 that is attached between the inner column 32 and outer column 20. In this embodiment, the extension and retraction device 42 is a gas cylinder having a cylinder body 43 and a cylinder stroke 45 that extends from and retracts into the cylinder body 43. In alternate embodiments, other known devices could be used as the extension and retraction device 42 in place of the gas cylinder, for example a linear actuator, a cable and pulley system, or one or more springs. In this embodiment, the extension and retraction device 42 is completely contained within and concealed by the inner column 32.

The outer column 20 comprises a plurality of inner planar surfaces 21a-21d (see FIG. 3, wherein only inner planar surface 21a is labeled for clarity) and a length 22 measured between the top and bottom ends thereof. A top block 26 is fixedly attached to the top end of the outer column 20 by routing each of fasteners 25a-25d through a respective hole 29a-29d located in the top end of the outer column 20 and into a respective hole 28a-28d located in the top block 26 (for clarity, only fasteners 25a,25b and holes 28a,28b are labeled in FIG. 2). The top block 26 further comprises a bolt hole 27 located therethrough. A cylinder adapter 44 having an internally-threaded opening is attached to the cylinder body 43 and a cylinder mounting bolt 49 is passed through the bolt hole 27 in the top block 26 and attached to the internally-threaded threaded opening of the cylinder adapter 44, thereby rigidly attaching the top end of the gas cylinder 42 to the top end of the outer column 20. In this embodiment, a cap 30 is optionally placed over the top end of the lift assembly 18 for aesthetic purposes.

The outer column 20 includes at its bottom end a plurality of bottom slide mounting holes 24a-24h (for clarity, only hole 24a labeled in FIG. 2) through each of which a respective one of a plurality of bottom slide fasteners 40a-40h is routed (for clarity only fasteners 40a-40d are shown and labeled in FIG. 2). A pair of the bottom slide fasteners 40a-40h are used to secure each of the bottom slides 39a-39d to the respective inner planar surface 21a-21d of the outer column 20. Each of the bottom slides 39a-39d has a planar outer surface (for clarity only planar outer surface 41 of bottom slide 39a is labeled in FIG. 2) that sits flush with the respective inner planar surface 21a-21d. Each of the bottom slides 39a-39d has an inner profile that complements the outer grooved profile of the inner column 32 (see FIG. 3), such that the bottom slides 39a-39d smoothly and stably engage the inner column 32 as the lift assembly 18 is raised and lowered via movement of the outer column 20.

The inner column 32 has a length 33 measured between the top and bottom ends thereof. As seen in FIGS. 1-5, the outer column 20 is axially aligned with and fully surrounds the inner column 32, almost entirely conceals the inner column 32 from view when the lift assembly 18 is in its fully-lowered position, and is raised directly above the inner column 32 when the lift assembly 18 is in a raised position. In this embodiment, at least 90 percent of the length 33 of the inner column 32 is concealed within and completely surrounded by the outer column 20 when the lift assembly 18 is in its fully-lowered position. Further, in all possible positions of the lift assembly 18, at least a portion of the length 33 of the inner column 32 is concealed within and completely surrounded by the outer column 20.

Each of a plurality of top slides 34a-34d are attached to the top end of the inner column 32 via a respective one of a plurality of top slide fasteners 35a-35d (for clarity only slides 34a,34b and fasteners 35a,35b are labeled in FIG. 2). Each of the top slides 34a-34d has a planar outer surface (for clarity only planar outer surface 36 of top slide 34b is labeled in FIG. 2) that sits flush with the respective inner planar surface 21a-21d of the outer column 20. Like the bottom slides 39a-39d, each of the top slides 34a-34d has an inner profile that complements the outer grooved profile of the inner column 32. The top slides 34a-34d permit the outer column 20 to move smoothly and stably along the length 33 of the inner column 32 as the height 19 of the lift assembly is raised or lowered.

In this embodiment, the inner profile and planar outer surfaces of the top slides 34a-34d (which are fixedly attached to the inner column 32) and the inner profile and planar outer surfaces of the bottom slides 39a-39d (which are fixedly attached to the outer column 20) comprise all of the contact surfaces between the inner column 32 and outer column 20, and all surfaces of the top slides 34a-34d and the bottom slides 39a-39d are completely concealed within the lift assembly 18 as its height 19 is adjusted. Said another way, in this embodiment all of the contact or sliding surfaces between the inner column 32 and outer column 20 are completely concealed as the height 19 of the lift assembly 18 is adjusted.

Attached to the bottom end of the gas cylinder 42 is a cylinder locking mechanism 46 that is attached to a cylinder release cable 50. In its default, locked position, the cylinder locking mechanism 46 arrests movement of the stroke 45 of the gas cylinder 42, thereby preventing the height 19 of the lift assembly 18 from being adjusted. As will be described in further detail below, pulling on the cylinder release cable 50 causes the cylinder locking mechanism 46 to engage the cylinder release pin (not shown), thereby freeing the stroke 45 of the gas cylinder 42 and permitting the height 19 of the lift assembly 18 to be adjusted. A lower mount pin 48 is routed through a passage in the cylinder locking mechanism 46 and a pair of lower mount holes (only lower mount hole 38 labeled in FIG. 4) and fixed in place by a pair of clips (not labeled), thereby fixing the bottom end of the gas cylinder 42 in place near the bottom end of the inner column 32. The cylinder release cable 50 enters the inner column 32 via a cable slot 37 located at the lower end of the inner column 32.

Figure 3:
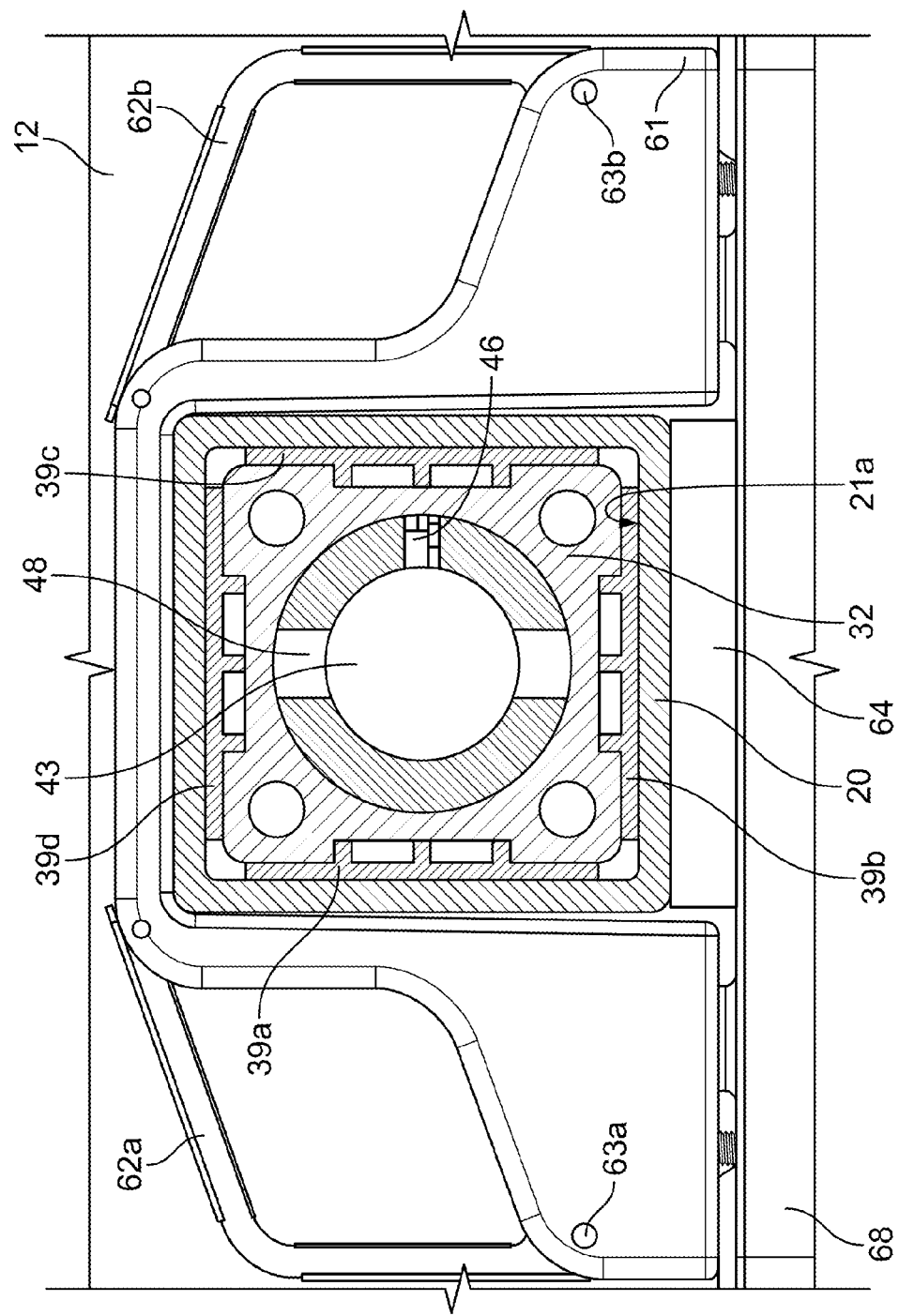
FIG. 3 is a partial sectional view taken along line 3-3 of FIG. 1.
Figure 4:
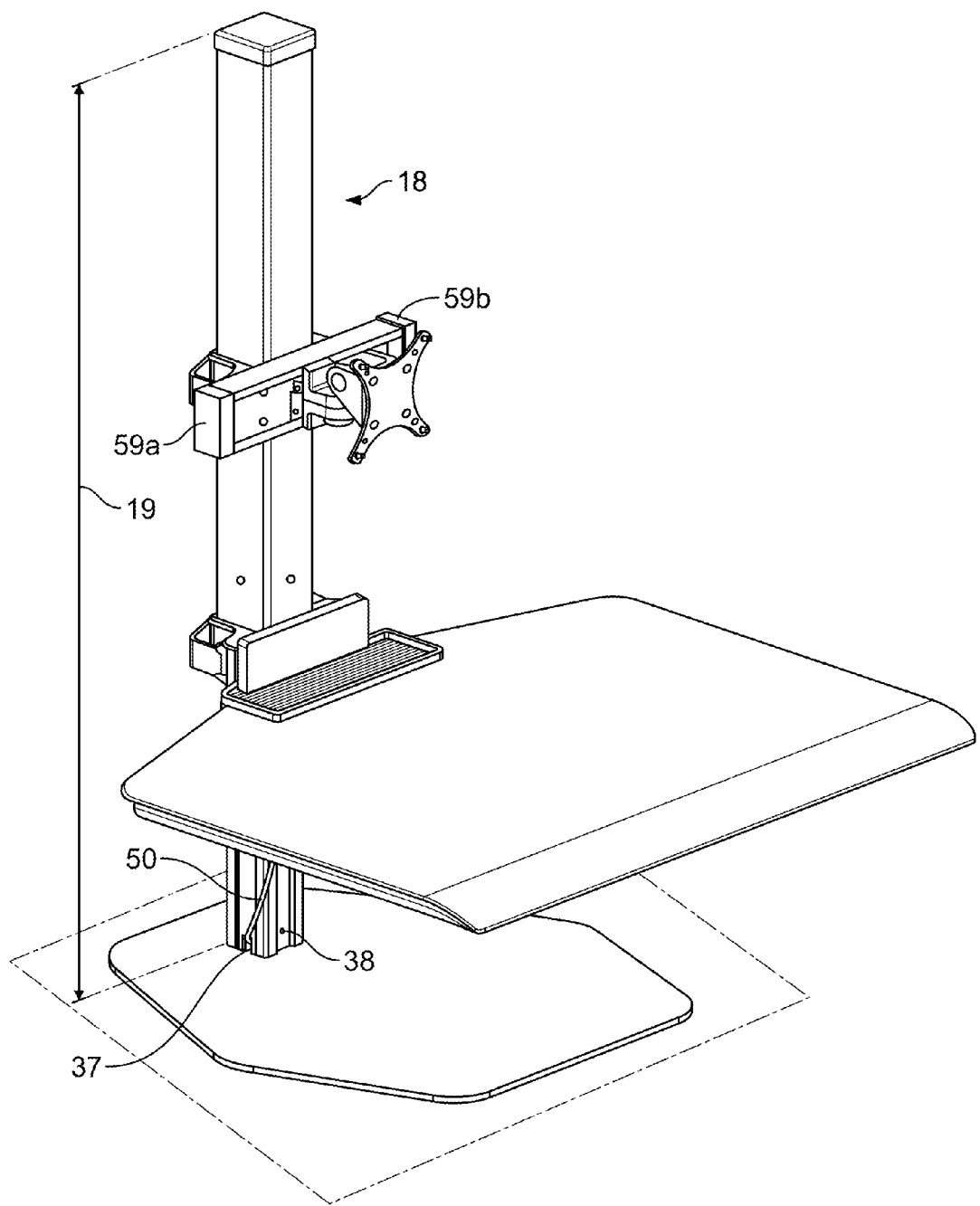
FIGS. 4 and 5 are perspective views of the sit-stand workstation according to FIG. 1, with the lift assembly in a raised position.

In this embodiment, a pair of attachment brackets 55,61 are clamped around the outer column 20 and support, respectively, support beam row 56 and worksurface 71 at fixed locations along the length 22 of the outer column 20. Support beam row 56 comprises a beam member 57 and has a length 58 that lies in a plane "F" when the beam member 57 is attached to the outer column via attachment bracket 55. A display support assembly 60 is attached to the beam member 57 and supports display 4. The display support assembly 60 is moveable along the length 58 of the beam member 57, as desired by the user. A pair of beam end caps 59a,59b cover the ends of the beam member 57. Additional details regarding the attachment brackets 55, 61, beam member 57, and display support assembly 60 are provided in U.S. Provisional Application Nos. 61/912,418 and 62/009,325, which are incorporated herein by reference. As best seen in FIG. 3, the attachment bracket 61 has a pair of cable routers 62a,62b that are each rotatably attached to the attachment bracket 61 via a respective pin 63a,63b. The cable routers 62,62b, as well as identical cable routers (not labeled) attached to the attachment bracket 55, can be used to keep device cables organized and safe from damage as the height 19 of the lift assembly 18 is adjusted.

The worksurface 71 is fixedly secured to a worksurface mounting bracket 65 via a plurality of worksurface fasteners 67a-67e (see FIG. 8), and the worksurface mounting bracket 65 is attached to a clamp block 64 which has been fitted between the worksurface mounting bracket 65 and the outer column 20 via a pair of fasteners 66a,66b that are routed through the clamp block 64 and into bracket mounting holes 23a,23b located on the outer column 20. The worksurface mounting bracket 65 is also securely attached to the attachment bracket 61 via a plurality of fasteners (not shown), thereby clamping the worksurface 71 to the outer column 20. In this embodiment, an accessory holder 68 having an upright back portion 69 and a bottom portion 70—which in this embodiment is textured—is clamped over the worksurface mounting bracket 65 and clamp block 64. The accessory holder 68 can hold electronic devices, e.g., a smartphone or tablet, and/or personal items, e.g., a wallet or keys, in a convenient, easy-to-reach location.

Figure 5:
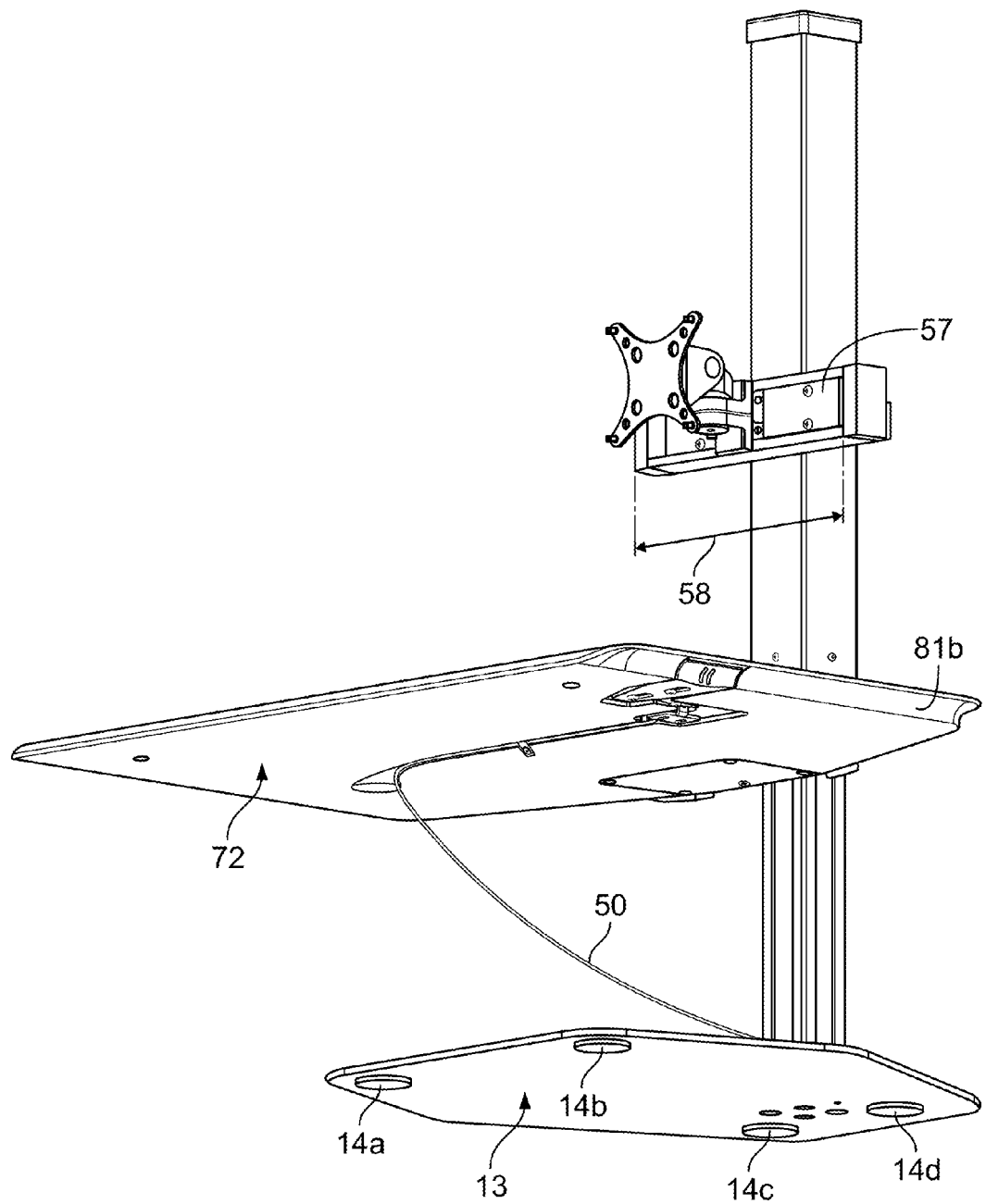
Figure 6:
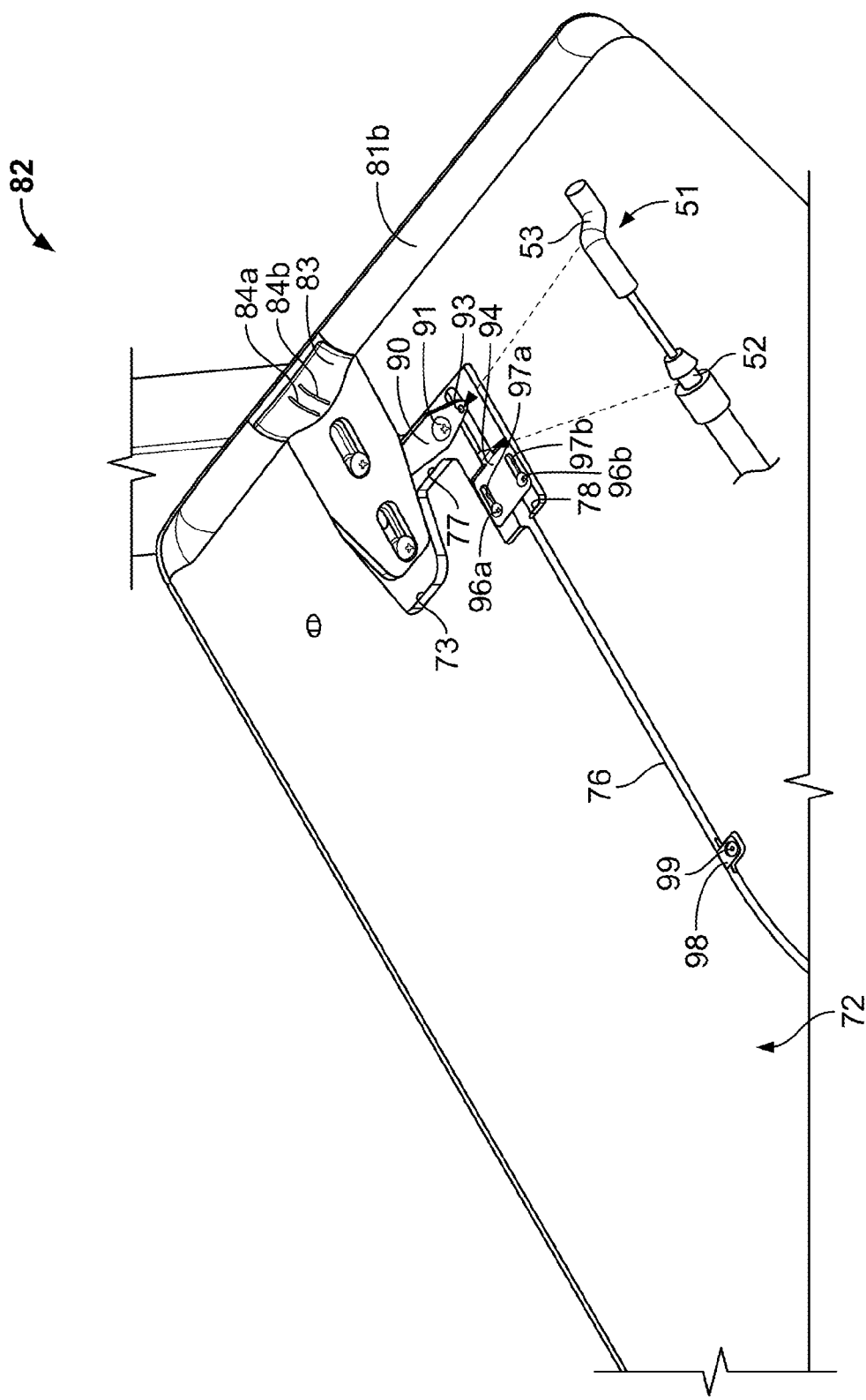
FIG. 6 is a partial view of the bottom surface of the worksurface of the embodiment of FIG. 1.
Figure 7A:
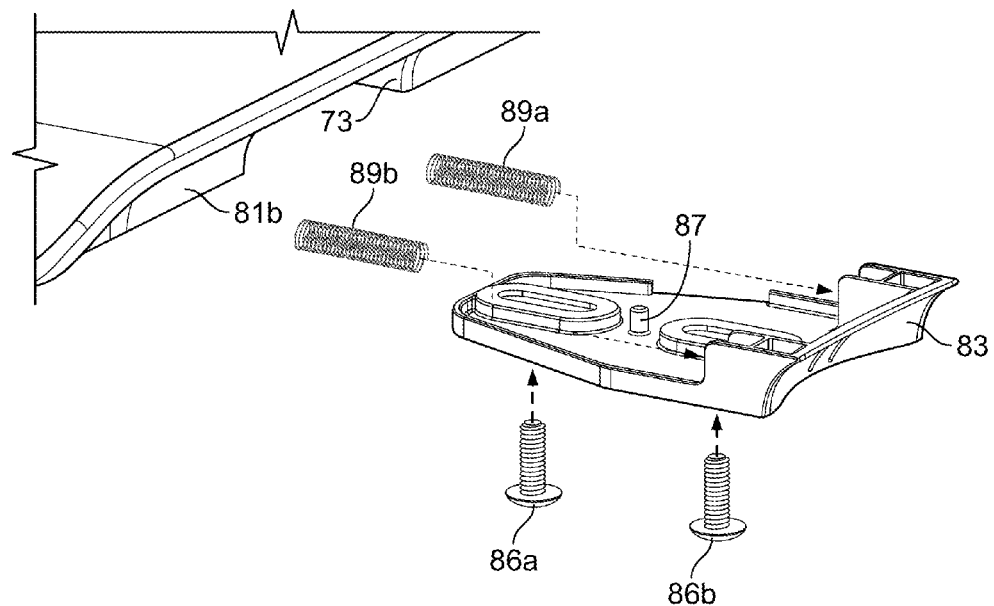
FIGS. 7A and 7B are partial exploded views of the slide release assembly of the embodiment of FIG. 1.
Figure 7B:
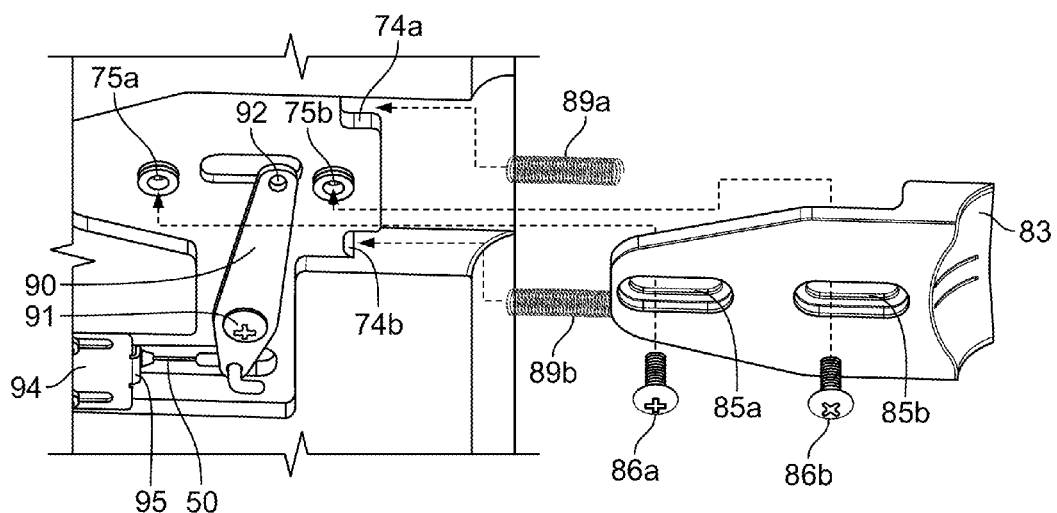
Figure 8:
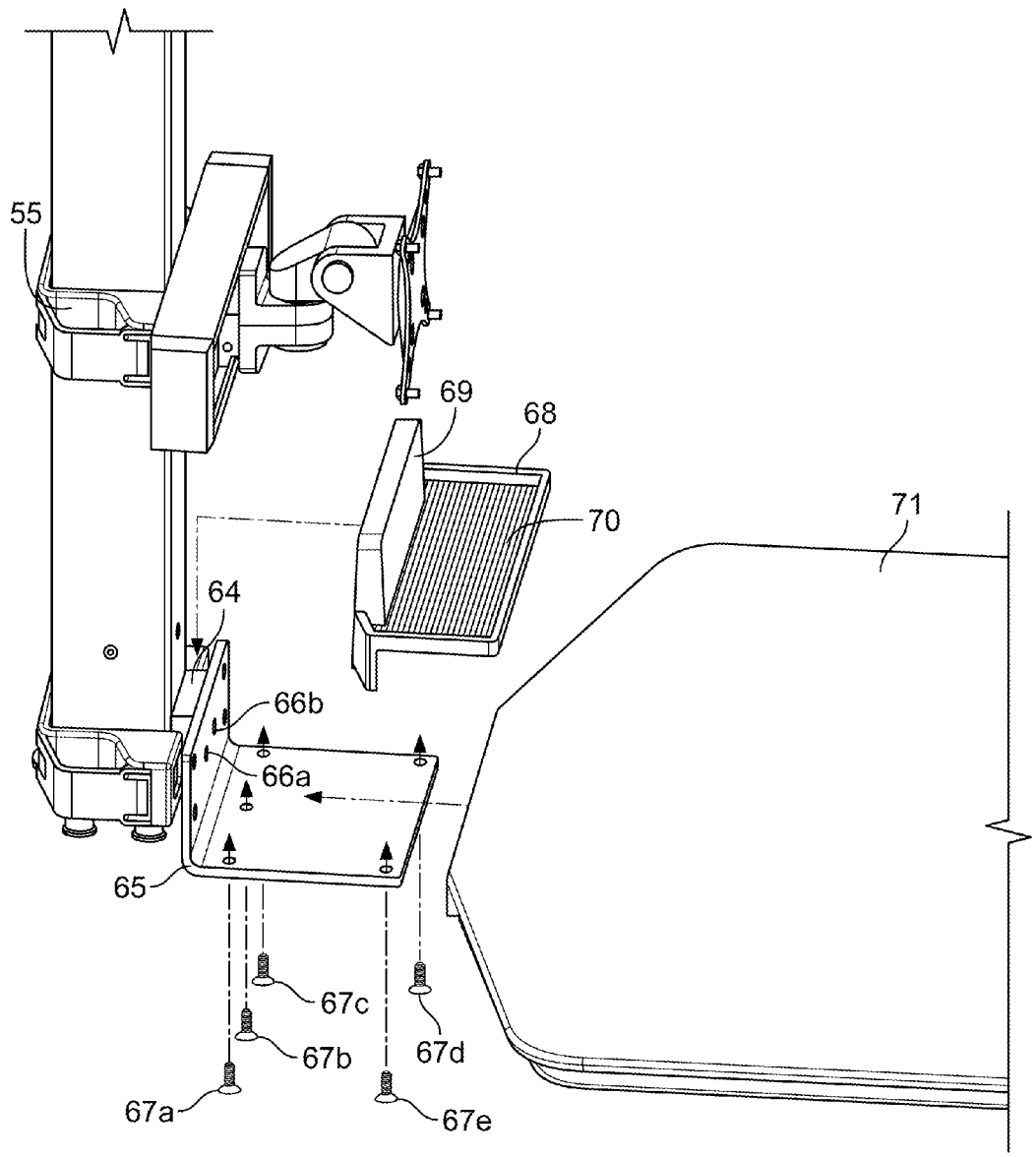
FIG. 8 is a partial exploded view of the connections between the worksurface and the lift assembly of the embodiment of FIG. 1.

The worksurface 71 has a top surface 79 that lies in a plane "E", a curved front portion, a pair of finger slots 81a,81b running along respective side surfaces thereof, and a bottom surface 72 that lies in a plane "D." The finger slots 81a,81b provide a comfortable place for the user to place their hands as the lift assembly 18 is being manually raised and lowered. Referring now to FIGS. 5, 6, and 7B the bottom surface 72 has a slide release cutout 73, a pair of spring seats 74a,74b, a pair of mounting holes 75a,75b, a cable slot 76 in which the cylinder release cable 50 is routed, a slide link cutout 77, and a bracket cutout 78.

An end 51 of the release cable 50 opposite the cylinder locking mechanism 46 is attached to a slide release assembly 82 that is attached to the bottom surface 72 of the worksurface 71. The slide release assembly 82 comprises a slide release 83, a slide link 90, and a cable tension adjustment bracket 94. Both the cable tension adjustment bracket 94 and the slide link 90 are attached to the end 51 of the release cable 50. In this embodiment, the slide release 83 is mounted along the finger slot 81b and has a curved shape to its front side to match the curvature of the finger slot 81b. A pair of locating tabs 84a,84b are provided on the slide release 83 so that the user can quickly locate the slide release 83 with their fingers without the need to look at the side of the worksurface 71.

Spring 89a is seated within spring seat 74a and spring 89b is seated within spring seat 74b, and the top side of the slide release includes notches to accommodate the ends of the springs 89a,89b. The slide release 83 is attached to the bottom surface 72 of the worksurface 71 via fasteners 86a,86b that extend respectively through fastener slots 85a,85b in the slide release 83 and attach respectively to mounting holes 75a,75b. The springs 89a,89b are compression springs that bias the slide release 83 such that its surface containing the locating tabs 84a,84b sits flush with the finger slot 81b when the slide release 83 is not being depressed.

The slide release 83 also includes a post 87 on its top side that engages a post hole 92 located on the slide link 90. The slide link 90 is pivotably attached to the bottom surface 72 of the worksurface 71 via a fastener 91. The slide link 90 also comprises a cable end attachment hole 93 that engages with an attachment hook 53 located at the end 51 of the release cable 50.

The fastener slots 85a,85b permit the slide release 83 to be depressed against the springs 89a,89b into the slide release cutout 73. Doing so causes the post 87, which is engaged with the post hole 92 on the slide link 90, to force the slide link 90 to rotate about the axis of the fastener 91, thereby moving the cable end attachment hole 93 towards the finger slot 81b. Because the end 51 of the release cable 50 is attached to the cable end attachment hole 93, so long as the release cable 50 is sufficiently taut the opposite end of the release cable will be pulled, thereby temporarily unlocking the cylinder locking mechanism 46 and permitting the height 19 of the lift assembly 18 to be adjusted so long as the slide release 83 remains depressed. When the user removes pressure from the slide release 83, the springs 89a,89b push the slide release 83 back into its default position, thereby removing the pulling force from the release cable 50 and causing the cylinder locking mechanism 46 to return to its default, locked position. Thus, in this embodiment, the user can only adjust the height 19 of the lift assembly 18 while the slide release assembly 82 is activated by depressing the slide release 83.

In alternate embodiments, the slide release assembly 82 need not be mounted to the bottom surface 72 of the worksurface 71, but could instead be mounted elsewhere on the worksurface 71 or elsewhere on the sit-stand workstation 10, or could be provided as a separable module that could be attached to the support surface or another surface within the usage environment. In further alternate embodiments, the slide release assembly 82 need not be hand controlled, but could instead be controlled by a foot pedal.

In this embodiment, the height 19 of the lift assembly 18 is adjusted manually by the user by gently lifting up or pressing down on the worksurface 71 as the slide release assembly 82 is being actuated. In alternate embodiments, the height 19 of the lift assembly 18 could be adjusted electronically.

Turning back to the embodiment of FIGS. 1-8, the cable tension adjustment bracket 94 includes a hook 95 that engages with a notched portion 52 located at the end 51 of the release cable and a pair of fastener slots 97a,97b through which a pair of fasteners 96a,96b are routed to releasably attach the bracket 94 to the bottom surface 72 of the worksurface. If it becomes necessary to change the tension on the end 51 of the release cable 50 in order to make the slide release assembly 82 function properly, the fasteners 96a,96b are loosened, the position of the bracket 94 is adjusted accordingly by sliding the position of the fastener slots 97a,97b with respect to the fasteners 96a,96b, and the fasteners 96a,96b are retightened.

Attached along the cable slot 76 is a cable retaining tab 98 that is attached to the bottom surface 72 of the worksurface 71 via a fastener 99 and that acts to maintain the release cable 50 within the cable slot 76 between the cable retaining tab 98 and the slide release assembly 82. In alternate embodiments, more than one cable retaining tab 98 could be provided along the length of the cable slot 76.

FIG. 9 shows an alternate embodiment of a sit-stand workstation 110 in which the support beam row 156 supports each of three displays 4a-4c via a respective one of a plurality of display support assemblies 160a-160c. The support beam row 156 comprises a center beam member 157 and a pair of side beam members 154a,154b that are each attached to the center beam member 157 via a respective one of a pair of hinges 188a,188b. The sit-stand workstation 110 comprises a lift assembly 118 that extends from a base plate 112 and supports a worksurface 171 and the support beam row 156 therefrom.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A support apparatus that is supported by and extends from a support surface onto which it is placed, the support apparatus comprising:
   an inner column having a length, the inner column having a fixed location relative to the support surface;
   an outer column having a length, the outer column being moveable through a range of possible positions relative to the support surface and the inner column, the length of the outer column being axially aligned with the length of the inner column, the outer column completely surrounding at least a portion of the length of the inner column in all possible positions of the outer column;
   an extension and retraction device, one end of the extension and retraction device being attached to the inner column and an opposite end of the extension and retraction device being attached to the outer column, the extension and retraction device having a locked position and an unlocked position, wherein in the unlocked position the extension and retraction device is operably configured to extend or retract to move the position of the outer column relative to the inner column and the support surface and wherein in the locked position the extension and retraction device cannot extend or retract;
   a locking mechanism that is operably engaged with the extension and retraction device, wherein in a default position thereof the locking mechanism biases the extension and retraction device into its locked position;
   a first attachment bracket attached to the outer column, the first attachment bracket being attached to a support beam row, the support beam row being operably configured to support at least one electronic display therefrom; and
   a second attachment bracket attached to the outer column, the second attachment bracket being attached to a worksurface.

2. The support apparatus of claim 1, wherein the lengths of the inner column and outer column extend orthogonally from the support surface.

3. The support apparatus of claim 1, wherein the support beam row comprises a beam member that is directly attached to the first attachment bracket, the beam member having a length along which a position of the at least one electronic display can be adjusted, wherein the length of the beam member is orthogonal to the lengths of the inner column and outer column.

4. The support apparatus of claim 1, wherein the first attachment bracket and second attachment bracket clamp around an exterior surface of the outer column such that at least a first portion and at least a second portion of the length of the outer column are surrounded by the first attachment bracket and second attachment bracket, respectively.

5. The support apparatus of claim 1, further comprising a base plate to which the inner column is attached, the base plate being operably configured to support the support apparatus from the support surface while permitting the support apparatus to be slid around on the support surface.

6. The support apparatus of claim 5, wherein the lengths of the inner column and outer column extend orthogonally from the base plate.

7. The support apparatus of claim 1, the locking mechanism being attached to a release cable, the locking mechanism further comprising an unlocked position that is achieved by pulling on the release cable with a sufficient amount of force, wherein in the unlocked position of the locking mechanism the extension and retraction device is placed into its unlocked position.

8. The support apparatus of claim 7, wherein the release cable is pulled by actuating a slide release assembly.

9. The support apparatus of claim 8, wherein the slide release assembly is attached to the worksurface.

10. The support apparatus of claim 8, wherein the slide release assembly has a default position in which it is not depressed and a depressed position that is achieved by pressing on the slide release assembly, wherein in the default position of the slide release assembly the force sufficient to move the locking mechanism into its unlocked position is not generated, and wherein in the depressed position of the slide release assembly the force sufficient to move the locking mechanism into its unlocked position is generated.

11. The support apparatus of claim 1, wherein the extension and retraction device is completely contained within and concealed by the inner and outer columns.

12. The support apparatus of claim 1, wherein the outer column has a fully-lowered position, wherein in the fully-lowered position at least 90 percent of the length of the inner column is concealed from view by the outer column.

13. A support apparatus that is supported by and extends from a support surface onto which it is placed, the support apparatus comprising:
   a support element having a length, the support element extending from the support surface in a fixed position relative to the support surface, the support element having a plurality of external contact surfaces;
   a moveable element having a length, the length of the moveable element being axially aligned with the length of the support element, the moveable element completely surrounding at least a portion of the length of the support element on all sides thereof in any possible position of the moveable element, the movable element having a plurality of internal contact surfaces;
   an extension and retraction device, one end of the extension and retraction device being attached to the support element and an opposite end of the extension and retraction device being attached to the moveable element, the extension and retraction device being operably configured to adjust the position of the moveable element relative to the support element and the support surface, the extension and retraction device having a locked position and an unlocked position, wherein in the unlocked position the extension and retraction device is operably configured to extend or retract to move the position of the moveable element relative to the support element and the support surface and wherein in the locked position the extension and retraction device cannot extend or retract; and
   a locking mechanism that is operably engaged with the extension and retraction device, wherein in a default position thereof the locking mechanism biases the extension and retraction device into its locked position, the locking mechanism being attached to a release cable, the locking mechanism further comprising an unlocked position that is achieved by pulling on the release cable with a sufficient amount of force, wherein in the unlocked position of the locking mechanism the extension and retraction device is placed into its unlocked position;
   wherein the external contact surfaces and internal contact surfaces comprise all of the surfaces that come into contact between the support element and the moveable element as the position of the moveable element is adjusted relative to the support element and the support surface, and wherein all of the external contact surfaces and internal contact surfaces remain concealed in all possible positions of the moveable element.

14. The support apparatus of claim 13, wherein the extension and retraction device is a gas cylinder.

15. The support apparatus of claim 13, wherein the extension and retraction device is a linear actuator.

16. The support apparatus of claim 13, the locking mechanism being attached to a first end of the release cable, the release cable having a second end that is attached to a slide release assembly, wherein when the slide release assembly is activated with a sufficient amount of force, the release cable is pulled with the sufficient amount of force necessary to place the locking mechanism in its unlocked position.

17. The support apparatus of claim 13, wherein the extension and retraction device is completely contained within and concealed by the support element and moveable element.

18. The support apparatus of claim 13, wherein the moveable element has a fully-lowered position, wherein in the fully-lowered position at least 90 percent of the length of the support element is concealed from view by the moveable element.

19. A support apparatus that is supported by and extends from a support surface onto which it is placed, the support apparatus comprising:
- a base plate having a substantially planar bottom surface that is adapted to rest on the support surface;
- an inner column having a length, the inner column being removably attached to the base plate and having a fixed location relative to the support surface and the base plate;
- an outer column having a length, the outer column being moveable through a range of possible positions relative to the support surface, the base plate, and the inner column, the length of the outer column being axially aligned with the length of the inner column, the outer column completely surrounding at least a portion of the length of the inner column in all possible positions of the outer column;
- an extension and retraction device located axially within the inner column and the outer column, one end of the extension and retraction device being attached to the inner column and an opposite end of the extension and retraction device being attached to the outer column, the extension and retraction device having a locked position and an unlocked position, wherein in the unlocked position the extension and retraction device is operably configured to extend or retract to move the position of the outer column relative to the inner column and the support surface and wherein in the locked position the extension and retraction device cannot extend or retract;
- a locking mechanism that is operably engaged with the extension and retraction device, wherein in a default position thereof the locking mechanism biases the extension and retraction device into its locked position;
- a first attachment bracket attached to the outer column, the first attachment bracket being attached to a support beam row, the support beam row being operably configured to support at least one electronic display therefrom; and
- a second attachment bracket attached to the outer column, the second attachment bracket being attached to a work-surface.

20. The support apparatus of claim 19, wherein the outer column has a fully-lowered position, wherein in the fully-lowered position at least 90 percent of the length of the inner column is concealed from view by the outer column.

* * * * *